Jan. 1, 1963     D. P. SHEPPARD     3,070,941
POWER LAWN MOWER CLEANER BLADE
Filed April 5, 1960
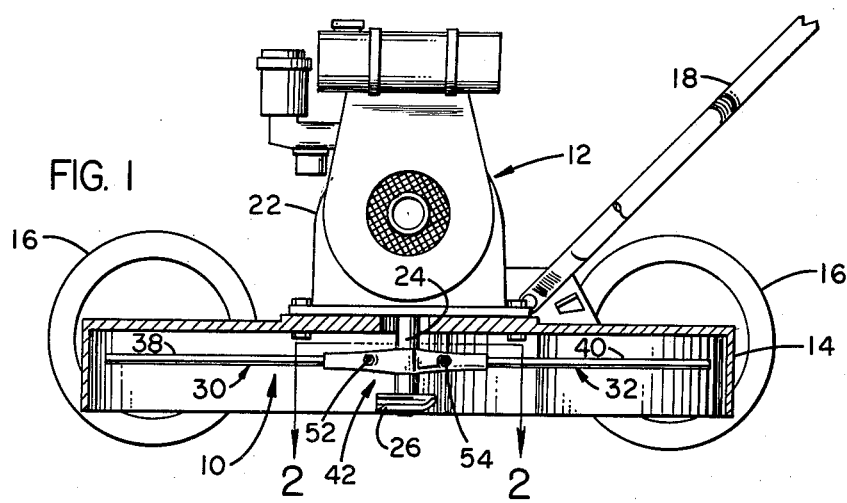
FIG. 1
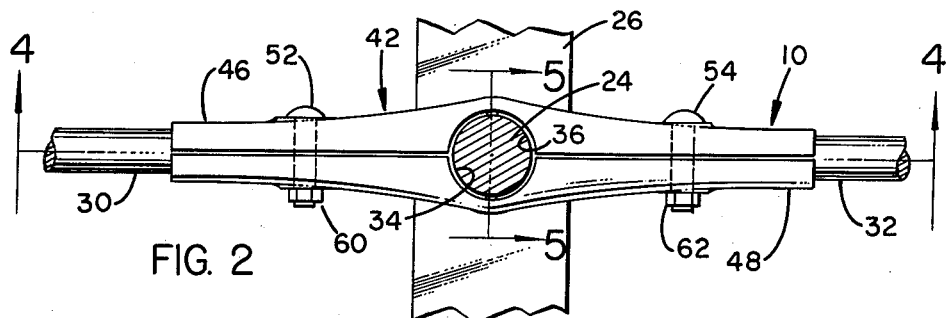
FIG. 2
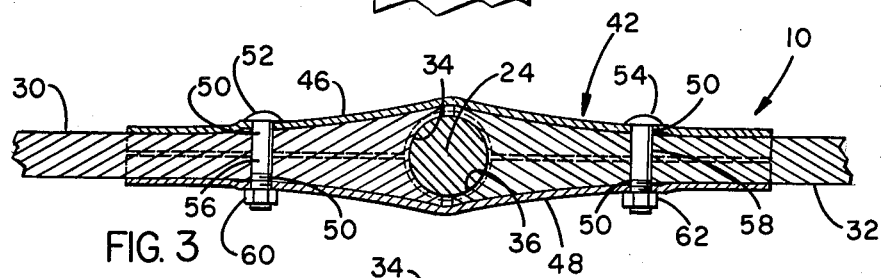
FIG. 3
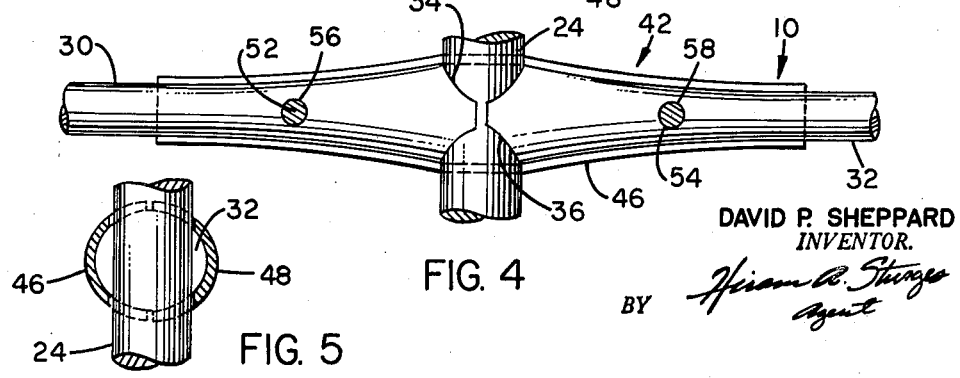
FIG. 4
FIG. 5
DAVID P. SHEPPARD
*INVENTOR.*
BY *Hiram A. Sturges*
*Agent*

United States Patent Office 3,070,941
Patented Jan. 1, 1963

3,070,941
POWER LAWN MOWER CLEANER BLADE
David P. Sheppard, Box 456, 7712 Serum Ave.,
Ralston, Nebr.
Filed Apr. 5, 1960, Ser. No. 20,186
1 Claim. (Cl. 56—25.4)

This invention relates to power lawn mowers and more particularly it is an object of this invention to provide a cleaner blade attachment for mowers of the rotary blade type.

Heretofore, during operation of the rotary-blade mowers, the task of keeping the interior surface of the mower housing free of grass clippings is a problem. Periodic cleaning away of grass clippings which have become impacted against the housing surface is necessary and time consuming. If the housing is not periodically cleaned the grass clippings, especially if the grass is wet, will build up on the housing surface and interfere with the proper outflow of the clippings from the housing.

In mowers most commonly used the blade is so designed to cause an air flow to carry the grass up and outwardly. The cuttings as they leave the blades are intended to be blown out of an opening in the side of the housing or from beneath the lower edge of the housing. However, due to the blade action, the cuttings are at the same time forced against the housing surface and are impacted thereagainst whereby continued use of the mower results in a build-up of cuttings stuck to the surface of the housing which impede proper throwout of the clippings from the housing.

It is an important object of this invention to provide a cleaner blade for rotary type lawn mowers comprising beater means attached to the crank shaft and positioned above the cutting blade whereby the beater means facilitates the flow of cuttings outwardly of the housing and at the same time cause description of the upward flow to prevent the cuttings from building up and adhering to the surface of the housing.

Another object of the invention is to provide a power lawn mower cleaner blade as described the construction of which permits of installation with a minimum of hand tools and little effort or skill on the part of the operator.

A further object of the invention is to provide a lawn mower cleaner blade of the character described which may be readily secured on the drive shaft of the mower without the necessity of drilling, refinishing or otherwise rebuilding the crank shaft.

Still another object of the invention is to provide a rotary lawn mower cleaner blade comprising beater means mounted for rotation with the cutter blade having portions disposed out of the plane of the cutting blade and preferably, though not necessarily, at a right angle with respect to the longitudinal axis of the cutting blade.

A still further object of the invention is to provide a cleaner blade attachment for rotary lawn mowers of a construction which is economical of manufacture, readily installed and efficient in operation.

Other and further objects and advantages of the invention will be understood from the following detailed description thereof.

In the drawings:

FIGURE 1 is a side view of a lawn mower with the cleaner blade attachment of this invention shown in operating position thereon, some parts shown in cross section for convenience of illustration;

FIGURE 2 is a cross sectional view through the mower crank shaft taken along the line 2—2 of FIGURE 1 showing the hub portion of the cleaner blade in top plan and on an enlarged scale.

FIGURE 3 is a horizontal cross sectional view taken through the hub portion of FIGURE 2;

FIGURE 4 is a vertical cross sectional view taken along the line 4—4 of FIGURE 2; and FIGURE 5 is a vertical cross sectional taken along the line 5—5 of FIGURE 2.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claim. And while there is stated the primary field of utility of the invention, it remains obvious that it may be employed in any other capacity wherein it may be found applicable.

In the accompanying drawings, and in the following specification, the same reference characters are used to designate the same parts and elements throughout. The numeral 10 refers to the invention in its entirety, and 12 indicates lawn mower having a housing 14 supported above the ground by wheels 16, numeral 18, a handle secured to the housing. A motor 22 is mounted on the housing and has a downwardly extending crank shaft 24, a horizontal cutting blade 26 mounted on the end of the shaft for rotation within the housing. With reference to FIGURE 1, it will be seen that the cleaner blade 10 of this invention is mounted on the shaft 24 between the under surface of the interior housing and the cutter blade 26. With particular reference to FIGURES 2, 3 and 4 cleaner blade comprises a pair of elongated beater members 30 and 32 of the shaft horizontally disposed on opposite sides with their ends abutting the shaft 24.

The beater members each have enlarged inner end portions which have concave recesses 34 and 36 respectively for receiving a part of the circumference of the shaft 24 to provide a large area of abutment.

The beater members 30 and 32 have inner end portions tapering from the enlarged end to extended blade portions 38 and 40 respectively, the blade portions being of uniform dimension throughout their length.

The cleaner blade further comprises a clamp member generally indicated by the numeral 42. The clamp 42 surrounds substantial portions of the exterior of the enlarged end portions of the beater members 30 and 32. The clamp 42 has opposed half sections 46 and 48 disposed on either side of the shaft and has a center portion extending substantially about the shaft, and further, end portions extending from the center portion.

The interior surfaces of the sections are formed to accommodate the inner end portions of the beater members therein.

The respective half sections of the clamp are provided with registering apertures 50 at either end thereof for receiving bolts 52 and 54 which latter also extend through apertures 56 and 58 provided in the inner end portions. Nuts 60 and 62 are threaded on the ends of the bolts to secure the clamp and beater members in position on the shaft.

The area surrounding the openings in the clamp sections is raised to form flat surfaces in engagement with the head and nut of the bolts to assure proper seating and even pressure as the nuts are drawn up.

With the concave recesses of the inner ends of the beater members 30 and 32 abutting the shaft 24 and with the clamp sections in place as shown, the bolts 52 and 54 are placed in their respective apertures and the nuts 60 and 62 threaded on the respective bolt.

The device is then arranged in a desired position on the shaft and preferably the beater members extend at a right angle with respect to the longitudinal axis of the cutting blade 26.

The nuts are then drawn up on the bolts whereby the clamp sections are drawn toward each other.

It is to be understood that the beater members are preferably formed of flexible material of sufficient resiliency whereby further tightening of the nuts will compress the enlarged ends thereof which pushes the surfaces of the concave recesses forcibly against the surface of the shaft providing a frictional engagement which anchors the cleaning device in position.

It is believed that the description when taken with the drawings is sufficiently clear as to make the operation of the device obvious and therefore a more lengthy description is regarded as unnecessary and that the invention fulfills the intended objects.

From the foregoing specification, it will become apparent that the invention disclosed will adequately accomplish the fucntions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore a more lengthy description is regarded as unnecessary.

Changes in shape, size and arrangement of details and parts such as come within the purview of the invention claimed may be resorted to in actual practice, if desired.

I claim:

A cleaning device for use with a power lawn mower having a vertical shaft and a horizontally rotating cutting blade, said cleaning device comprising: a plurality of elongated beater means respectively extending radially outward from said shaft at points equidistantly spaced around the circumference of said shaft, and means for attaching said beater means to said shaft for rotation therewith, said beater means comprising at least two aligned beater members spaced sufficiently to receive said shaft therebetween, the inner ends of each beater member having a concave recess for receiving a part of said shaft, the walls of said recess being adapted to abut said shaft over a large area, said beater members being formed of flexible material which is adapted to be expanded and contracted with pressure, the inner end portions of each of said beater members being of increasing transverse size tapered from an outer part of a tapered inner end portion to a larger size adjacent the respective recessed end, and said clamp extending along the tapered inner portion of one of said beaters past said shaft and also extending along the tapered portion of the other of said beaters, said clamp surrounding substantially portions of the exterior of said beater members as the beater members are seen in transverse cross section to said clamp, said clamp having a plurality of sections each section being substantially continuous with the length of said clamp but being separated from the other section by a space, and means for drawing said sections toward each other to apply pressure against said beater members to push the same against the shaft.

References Cited in the file of this patent

UNITED STATES PATENTS

| | | |
|---|---|---|
| 2,641,100 | Sylvester | June 9, 1953 |
| 2,796,714 | Denney | June 25, 1957 |